United States Patent
Tsujita et al.

(10) Patent No.: US 10,501,101 B2
(45) Date of Patent: Dec. 10, 2019

(54) TRAIN-POSITION DETECTION DEVICE

(71) Applicant: Mitsubishi Electric Corporation, Chiyoda-ku (JP)

(72) Inventors: Wataru Tsujita, Chiyoda-ku (JP); Seiya Nagashima, Chiyoda-ku (JP); Tadashi Yamamoto, Chiyoda-ku (JP); Kazuhiro Tahara, Chiyoda-ku (JP); Kenji Kataoka, Chiyoda-ku (JP)

(73) Assignee: Mitsubishi Electric Corporation, Chiyoda-ku (JP)

(*) Notice: Subject to any disclaimer, the term of this patent is extended or adjusted under 35 U.S.C. 154(b) by 232 days.

(21) Appl. No.: 15/541,745

(22) PCT Filed: Oct. 20, 2015

(86) PCT No.: PCT/JP2015/079565
§ 371 (c)(1),
(2) Date: Jul. 6, 2017

(87) PCT Pub. No.: WO2016/117192
PCT Pub. Date: Jul. 28, 2016

(65) Prior Publication Data
US 2018/0273063 A1    Sep. 27, 2018

(30) Foreign Application Priority Data

Jan. 22, 2015    (JP) ................. 2015-010376

(51) Int. Cl.
*B61L 25/02* (2006.01)
*G01S 3/14* (2006.01)
(Continued)

(52) U.S. Cl.
CPC ......... *B61L 25/025* (2013.01); *B61L 15/0027* (2013.01); *B61L 25/021* (2013.01);
(Continued)

(58) Field of Classification Search
CPC ...... B61L 1/00; B61L 1/02; B61L 1/14; B61L 1/18; B61L 25/00; B61L 25/02; B61L 25/025; B61L 27/00
See application file for complete search history.

(56) References Cited

U.S. PATENT DOCUMENTS

2016/0325766 A1    11/2016   Tsujita et al.

FOREIGN PATENT DOCUMENTS

| JP | 11-227607 A | 8/1999 | |
| JP | 2011-227607 | * 8/1999 | ............. B61L 25/02 |

(Continued)

OTHER PUBLICATIONS

International Search Report issued Jan. 26, 2016, in PCT/JP2015/079565, filed Oct. 20, 2015.

(Continued)

*Primary Examiner* — Robert J McCarry, Jr.
(74) *Attorney, Agent, or Firm* — Oblon, McClelland, Maier & Neustadt, L.L.P.

(57) ABSTRACT

A train-position detection device includes: a radio-wave's angle-of-arrival calculator configured to calculate an angle of arrival of a radio wave on the basis of a reception signal received by an array antenna and a receiver; a position acquisition unit configured to acquire information on an installation position of a ground-based wireless communication apparatus from the reception signal; a train-position calculator configured to calculate a train position on the basis of a movement distance of a train; a correction-amount-to-train-position calculator configured to calculate a train-position correction amount, by using the calculated angle of arrival, the installation position of the ground-based wireless communication apparatus acquired by the position acquisition unit, and the calculated train position; and a train-position correcting unit configured to correct the cal- (Continued)

culated train position by using the train-position correction amount calculated by the correction-amount-to-train-position calculator.

12 Claims, 6 Drawing Sheets

(51) Int. Cl.
*B61L 15/00* (2006.01)
*G01S 11/04* (2006.01)
*G01C 22/02* (2006.01)
*G01S 3/04* (2006.01)
*H04W 84/00* (2009.01)

(52) U.S. Cl.
CPC .............. *G01S 3/14* (2013.01); *G01S 11/04* (2013.01); *G01C 22/02* (2013.01); *G01S 3/043* (2013.01); *H04W 84/005* (2013.01)

(56) References Cited

FOREIGN PATENT DOCUMENTS

| | | | |
|---|---|---|---|
| JP | 2005-253233 A | 9/2005 | |
| JP | 2009-073397 | * 4/2009 | ................ B61L 3/12 |
| JP | 2009-73397 A | 4/2009 | |
| JP | 2009-225585 A | 10/2009 | |
| JP | 2010-269620 A | 12/2010 | |
| JP | 2011-37371 A | 2/2011 | |
| JP | 2011-211903 A | 10/2011 | |
| JP | 2012-20734 A | 2/2012 | |
| WO | 2015/104876 A1 | 7/2015 | |

OTHER PUBLICATIONS

Tsujita et al., "Train Positioning System based on Angle of Arrival (AOA) Techniques", Mar. 5, 2015.

* cited by examiner

TRAIN-POSITION DETECTION DEVICE

TECHNICAL FIELD

The invention relates to a train-position detection device that detects the position of a train that is required for performing train operation control.

BACKGROUND ART

A train-position detection device disclosed in Patent Literature 1 is constituted by a tachometer-generator that is connected to an axle of a train vehicle, an in-vehicle device that is provided on the train vehicle, and a ground-based device that is provided on the track on which the train vehicle runs. The train-position detection device measures the train position from pulses output by the tachometer-generator in accordance with the rotation of a wheel during running of the train and the diameter of the wheel, but has had a problem in that a measurement error occurs when the wheel slips and skids. In order to correct the measurement error, information of the ground-based device (ID tag) in which position information is pre-stored is read using the in-vehicle device (ID reader), and the measured train position is corrected using the position information read from the ground-based device.

The train-position detection device disclosed in Patent Literature 2 is constituted by an in-vehicle wireless communication apparatus that is provided on the train and a ground-based wireless communication apparatus that is provided by the track of the train. The in-vehicle wireless communication apparatus measures an angle of arrival of a radio wave emitted by the ground-based wireless communication apparatus. Subsequently, the in-vehicle wireless communication apparatus calculates the train position relative to the installation position of the ground-based wireless communication apparatus using the principle of triangulation based on the measured angle of arrival of the radio wave and a distance from the ground-based wireless communication apparatus to the track (hereinafter referred to as a "track distance").

CITATION LIST

Patent Literatures

Patent Literature 1: Japanese Patent Application Publication No. 2011-211903.
Patent Literature 2: Japanese Patent Application Publication No. 2009-73397.

SUMMARY OF INVENTION

Technical Problem

In the train-position detection device disclosed in Patent Literature 1 described above, in the case where the train position is detected with high accuracy, it is necessary to install a large number of ground-based devices. Accordingly, there has been a problem in that a cost is required for installation and maintenance of the ground-based devices.

In the train-position detection device disclosed in Patent Literature 2 described above, it is necessary to pre-store the track distance from the ground-based wireless communication apparatus to the track on which the train runs. Accordingly, in the case where there are a plurality of the tracks, there has been a problem in that, when the track distance is erroneously set by mistakenly choosing the track on which the train having the in-vehicle wireless communication apparatus mounted thereon runs, an error occurs when the train position is calculated.

The invention has been made in order to solve the above problems, and an object thereof is to detect the train position with high accuracy without using information on the positions of the ground-based devices and their track distances.

Solution to Problem

According to the invention, there is provided a train-position detection device that detects a position of a train by using a reception signal which, when a ground-based wireless communication apparatus installed on a ground emits a transmission signal as a radio wave including information on an installation position, is extracted by an in-vehicle wireless communication apparatus mounted on the train from the radio wave that has been received by the in-vehicle wireless communication apparatus. The train-position detection device includes: a radio-waves angle-of-arrival calculator configured to calculate an angle of arrival of a radio wave on the basis of the reception signal; a position acquisition unit for the ground-based wireless communication apparatus, configured to acquire information on the installation position of the ground-based wireless communication apparatus, from the reception signal; a train-position calculator configured to calculate a train position based on movement distances of the train; a correction-amount-to-train-position calculator configured to calculate a train-position correction amount for correcting the train position calculated by the train-position calculator, by using the acquired information on the installation position, and a plurality of combinations of the angle of arrival and the train position related to the same around-based wireless communication apparatus, calculated when the train runs through a plurality of points on a track road; and a train-position correcting unit configured to correct the train position calculated by the train-position calculator by using the train-position correction amount calculated by the correction-amount-to-train-position calculator.

Advantageous Effects of Invention

According to the invention, the train-position correction amount is calculated from the angle of the radio wave that arrives at the in-vehicle wireless communication apparatus from the ground-based wireless communication apparatus, the installation position of the ground-based wireless communication apparatus acquired from the reception signal, and the train position calculated from the movement distance of the train, to thereby correct the train position. Thus, it is possible to detect the train position with high accuracy without using the information on the positions of the ground-based devices and their track distances. Therefore, it is possible to reduce the cost required for the installation and maintenance of the ground-based devices. In addition, setting of the track distance becomes unnecessary, and hence it is possible to prevent the occurrence of the error caused by erroneous setting of the track distance when the train position is calculated.

BRIEF DESCRIPTION OF DRAWINGS

FIGS. 3A to 3C are views illustrating the relationship among a ground-based wireless communication apparatus position Y0, a train position Y, a train-position correction amount b, a radio-wave's angle of arrival θ, and a track distance a.

FIG. 4 is a view illustrating the relationship between the train-position correction amount b and the track distance a.

DESCRIPTION OF EMBODIMENTS

In the following, in order to describe the invention in greater detail, embodiments will be described according to the accompanying drawings.

Embodiment 1

Figure 1:
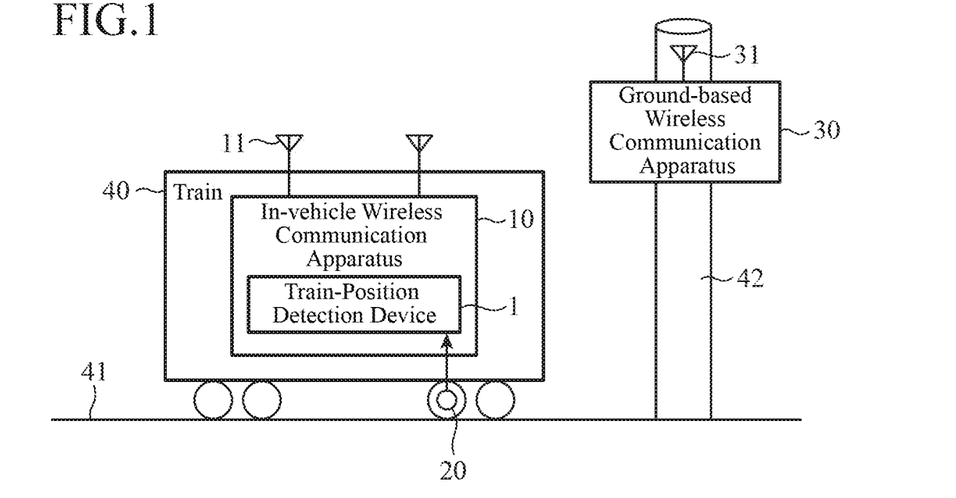
FIG. 1 is a view showing an example of the configuration of a train position detection system that uses a train-position detection device according to Embodiment 1 of the invention.

FIG. 1 is a view showing an example of the configuration of a train position detection system that uses a train-position detection device 1 according to Embodiment 1 of the invention. The train position detection system includes an in-vehicle wireless communication apparatus 10 that is mounted on a train 40 and a ground-based wireless communication apparatus 30 that is installed by a track road 41 on which the train 40 runs. The in-vehicle wireless communication apparatus 10 includes the train-position detection device 1.

Figure 2:
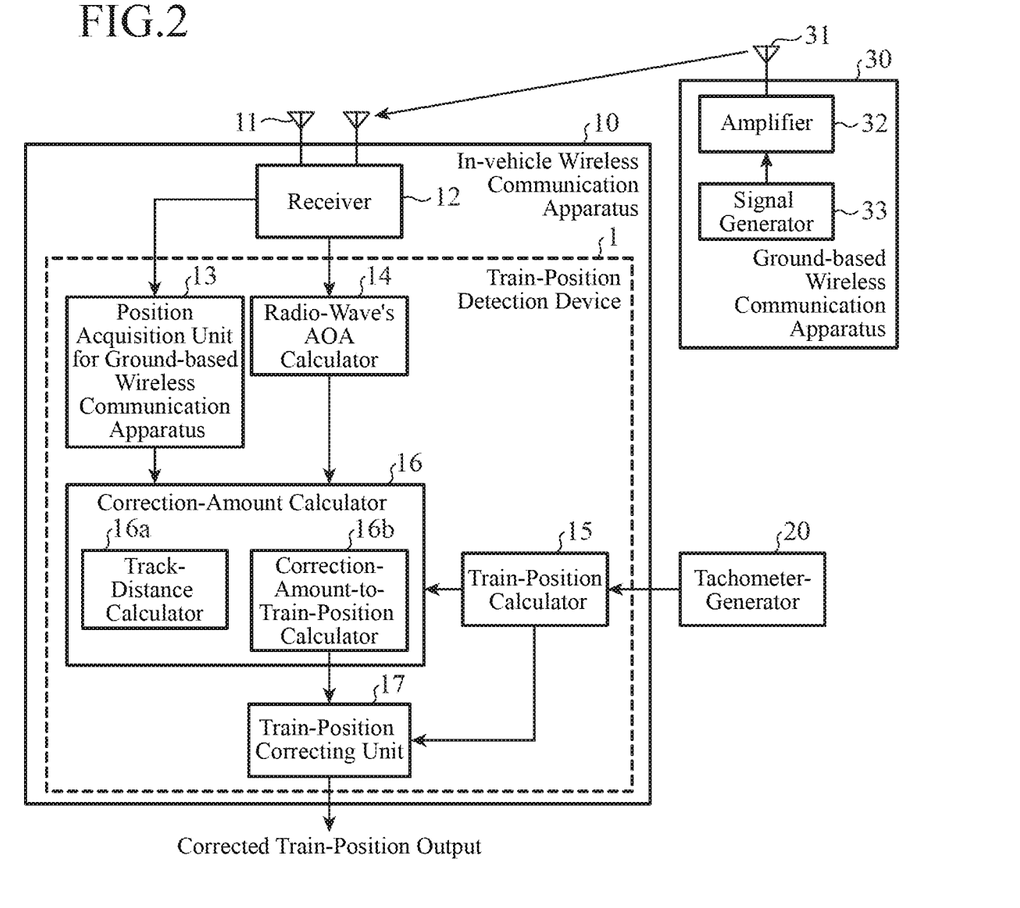
FIG. 2 is a block diagram showing an example of the configuration of the train position detection system that uses the train-position detection device according to Embodiment 1.

FIG. 2 is a block diagram showing an example of the configuration of the train position detection system. The in-vehicle wireless communication apparatus 10 includes an array antenna 11, a receiver 12, a position acquisition unit 13 for a ground-based wireless communication apparatus, a radio-wave's angle-of-arrival (AOA) calculator 14, a train-position calculator 15, and a correction-amount calculator 16. The train-position detection device 1 is constituted by the position acquisition unit 13 for a ground-based wireless communication apparatus, the radio-wave's AOA calculator 14, the train-position calculator 15, the correction-amount calculator 16, and a train-position correcting unit 17.

A tachometer-generator 20 is connected to the axle of the train 40.

The ground-based wireless communication apparatus 30 includes an antenna 31, an amplifier 32, and a signal generator 33. The ground-based wireless communication apparatus 30 is installed on a utility pole 42 by the track road 41 shown in FIG. 1, a roof of a station's platform or the like.

Next, an operation will be described.

In the ground-based wireless communication apparatus 30, the signal generator 33 converts position information indicative of the position at which the ground-based wireless communication apparatus 30 is installed into a transmission signal having a predetermined frequency, amplitude, or phase, and outputs the transmission signal to the amplifier 32. The amplifier 32 performs power amplification of the transmission signal output by the signal generator 33, and outputs the transmission signal to the antenna 31. The antenna 31 emits the transmission signal output by the amplifier 32 as a radio wave.

The position information of the ground-based wireless communication apparatus 30 may also be, e.g., a distance from a reference position on the track road 41 to the installation position of the ground-based wireless communication apparatus 30, distance information in kilometer units that is used in railroads, or the latitude and longitude indicative of the installation position of the ground-based wireless communication apparatus 30, or may be an ID peculiar to the ground-based wireless communication apparatus 30. In the case where the position information of the ground-based wireless communication apparatus 30 is the ID, information on the installation position associated with the ID may be appropriately stored on the side of the in-vehicle wireless communication apparatus 10.

When the train 40 arrives at a place where the ground-based wireless communication apparatus 30 is present, the radio wave emitted from the ground-based wireless communication apparatus 30 is received by the array antenna 11 of the in-vehicle wireless communication apparatus 10 mounted on the train 40, and is output to the receiver 12. Herein, for calculation of a radio-wave's angle of arrival as described later, the antenna of the in-vehicle wireless communication apparatus 10 is the array antenna 11 in which, e.g., a plurality of antenna elements are disposed linearly in substantially parallel to the running direction of the train 40.

The receiver 12 extracts and amplifies a radio wave component emitted from the ground-based wireless communication apparatus 30, and outputs the radio wave component to each of the position acquisition unit 13 for a ground-based wireless communication apparatus, and the radio-wave's AOA calculator 14 as a reception signal.

The position acquisition unit 13 for a ground-based wireless communication apparatus acquires the position information indicative of the installation position of the ground-based wireless communication apparatus 30 from the reception signal output by the receiver 12, and outputs the position information to the correction-amount calculator 16 as a ground-based wireless communication apparatus position. As described above, in the case where the position information of the ground-based wireless communication apparatus 30 is the ID, the position acquisition unit 13 for a ground-based wireless communication apparatus extracts the installation position associated with the ID of the ground-based wireless communication apparatus 30 from a list indicative of a correspondence between the pre-stored ID and the installation position.

The radio-wave's AOA calculator 14 calculates an angle of arrival of the radio wave from the ground-based wireless communication apparatus 30 based on the reception signal output by the receiver 12, and outputs the angle of arrival of the radio wave to the correction-amount calculator 16. The angle of arrival of the radio wave is calculated from, e.g., the frequency, amplitude, and phase of the reception signal. Specifically, techniques used in radar or the like are applied to the calculation and, for example, monopulse angle measurement, a MUSIC (Multiple Signal Classification) method, and the maximum likelihood estimation are used.

The train-position calculator 15 calculates the train position based on the movement distance of the train 40, and outputs the train position to each of the correction-amount calculator 16 and the train-position correcting unit 17.

Specifically, the train-position calculator 15 measures the train position by counting pulses output from the tachometer-generator 20 connected to the axle of the train 40, calculating the movement distance from a count value and the diameter of a wheel, and performing the addition of the movement distance. Embodiment 1 describes an example in which the train-position calculator 15 calculates the train position by using the tachometer-generator 20, but the train-position calculator 15 may also use an element other than the tachometer-generator 20. For example, the train-position calculator 15 may acquire an acceleration during running of the train measured by an acceleration sensor installed on the train 40, and measure the train position by integrating the acceleration. In addition, the train-position calculator 15 may acquire a frequency during the running of the train measured by a sound wave sensor or radio wave sensor installed on the train 40, calculate a train speed by using the Doppler effect in which the frequency becomes proportional to the movement speed of the train 40, and measure the train position by integrating the train speed.

Thus, the train-position calculator 15 uses the method for measuring the train position by performing the addition of the movement distance per unit time, and hence the measurement error of the movement distance tends to accumulate. For example, in the case where the tachometer-generator 20 is used, the measurement error that has occurred when the wheel slips and skids accumulates.

To cope with this, the measurement error is corrected by the correction-amount calculator 16 and the train-position correcting unit 17 as described later, and the high-accuracy train position is thereby determined.

The correction-amount calculator 16 includes an track-distance calculator 16a and a correction-amount-to-train-position calculator 16b. The correction-amount-to-train-position calculator 16b calculates a train-position correction amount for correcting the train position output by the train-position calculator 15 by using the ground-based wireless communication apparatus position output by the position acquisition unit 13 for a ground-based wireless communication apparatus, the radio wave's angle of arrival output by the radio-wave's AOA calculator 14, and the train position output by the train-position calculator 15, and outputs the train-position correction amount to the train-position correcting unit 17. The track-distance calculator 16a calculates a distance between the ground-based wireless communication apparatus 30 and the track road 41 on which the train 40 runs (hereinafter referred to as a track distance) by using the ground-based wireless communication apparatus position output by the position acquisition unit 13 for a ground-based wireless communication apparatus, the radio wave's angle of arrival output by the radio-wave's AOA calculator 14, and the train position output by the train-position calculator 15. In the case where the radio wave's angle of arrival when the radio wave arrives from a direction orthogonal to the track road 41 is 0 degrees, the track distance is a distance between the ground-based wireless communication apparatus 30 and the in-vehicle wireless communication apparatus 10 when the radio wave's angle of arrival becomes 0 degrees.

The calculations of the track distance and the train-position correction amount in the track-distance calculator 16a and the correction-amount-to-train-position calculator 16b are performed when the train 40 is present on the track road 41 in the vicinity of the ground-based wireless communication apparatus 30. Specifically, the track-distance calculator 16a and the correction-amount-to-train-position calculator 16b perform the calculations of the track distance and the train-position correction amount by using measurement values in the case where the radio wave's angle of arrival calculated in the radio-wave's AOA calculator 14 is within a predetermined angle (e.g., between ±45 degrees). The predetermined angle preferably corresponds to a predetermined track section in FIGS. 3A to 3C as described later.

Figure 3A:
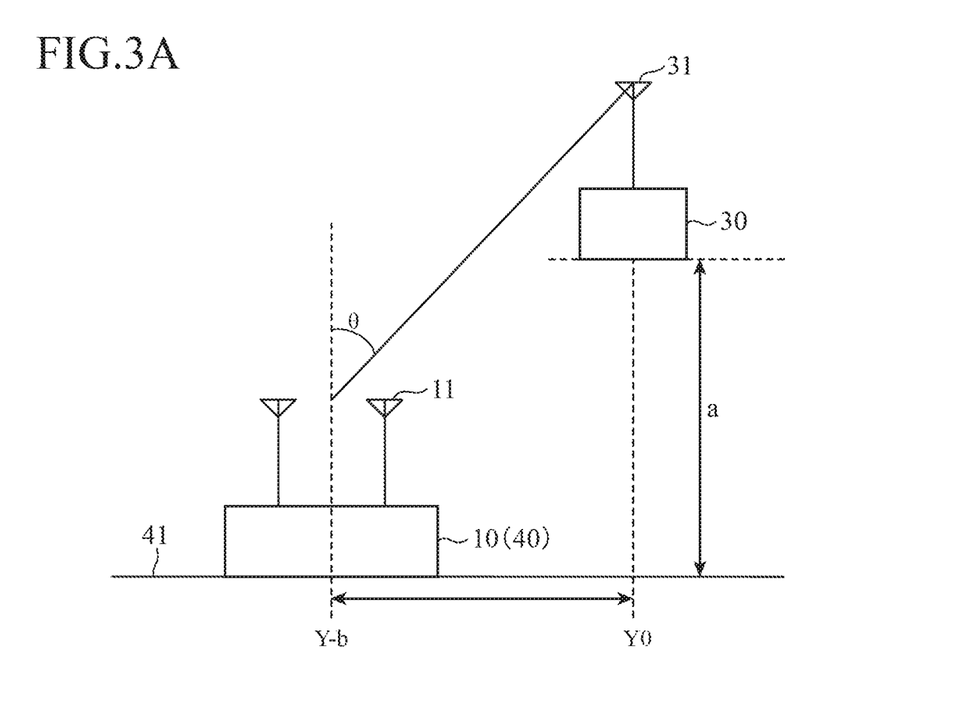

FIG. 3A is a view illustrating the relationship among a ground-based wireless communication apparatus position Y0, a train position Y, a train-position correction amount b, an angle of arrival θ of a radio wave, and a track distance a. In the case where the track road 41 in the vicinity of the ground-based wireless communication apparatus 30 can be considered to be straight, the following Expression (1) is established.

$$(Y-b-Y0)/a = \tan \theta \quad (1)$$

Herein, when y=Y−Y0 and x=tan θ are satisfied, Expression (1) has a linear relationship represented by Expression (2).

$$y = a \times x + b \quad (2)$$

Let the position of the foot of a perpendicular dropped from the ground-based wireless communication apparatus 30 to the track road 41 be the ground-based wireless communication apparatus position Y0. Let the position of the in-vehicle wireless communication apparatus 10 mounted on the train 40 be the true position of the train 40, i.e., the train position Y minus a correction amount b to the train position. Let the radio wave's angle of arrival θ when the radio wave arrives from the direction orthogonal to the track road 41 be 0 degrees and, with 0 degrees being used as the boundary, the side of the running direction is represented by a positive angle and the side opposite to the running direction is represented by a negative angle.

The track distance a will be described with reference to FIG. 3B and FIG. 3C. In the drawings, trains 40a and 40b move from the left side to the right side on the paper sheet.

As shown in FIG. 3A, the track distance a corresponds to the length of the foot of the perpendicular dropped from the ground-based wireless communication apparatus 30 to the track road 41 (an intersection point with the track road 41). To be exact, the track distance a corresponds to the length of the foot of the perpendicular dropped to a tangent in the running direction of the train 40 on the track road 41 at a point at which the train 40 is present.

Figure 3B:
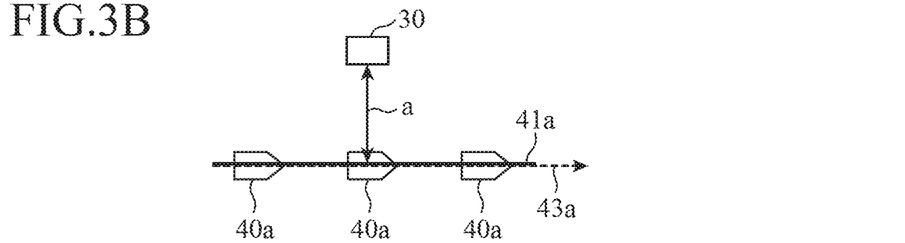
Figure 3C:
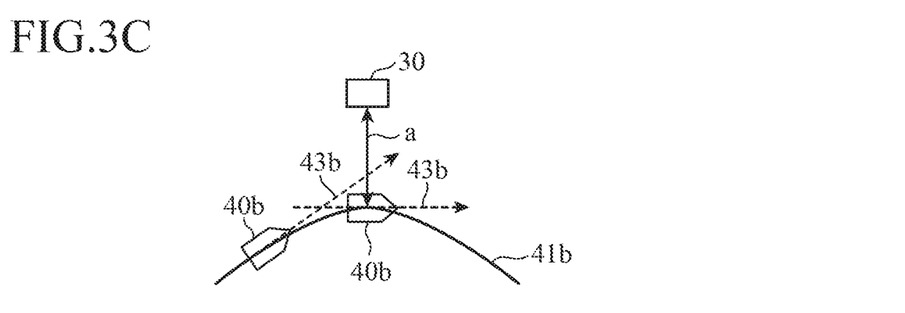

As shown in FIG. 3B, in the case where a track road 41a can be approximated as a straight line, a distance between a tangent 43b of the track road 41a formed by the running direction of a train 41a at the track position at which the train 40a is present and the ground-based wireless communication apparatus 30 is constant. On the other hand, as shown in FIG. 3C, in the case where a track road 41b cannot be approximated as the straight line, a distance between the tangent 43a of the track road 41b formed by the running direction of a train 41b at the track position at which the train 40b is present and the ground-based wireless communication apparatus 30 is not constant.

In the case where a predetermined track section in which the ground-based wireless communication apparatus 30 is present is set to a section having a range between about ±5 meters or a section having a length corresponding to the length of one train vehicle (e.g., 20 m), each of the tracks 41a and 41b can be substantially approximated as the straight line in this section without problems. Thus, the track distance a is usually substantially constant in the predetermined track section, and Expression (1) described above uses this condition.

Figure 4:
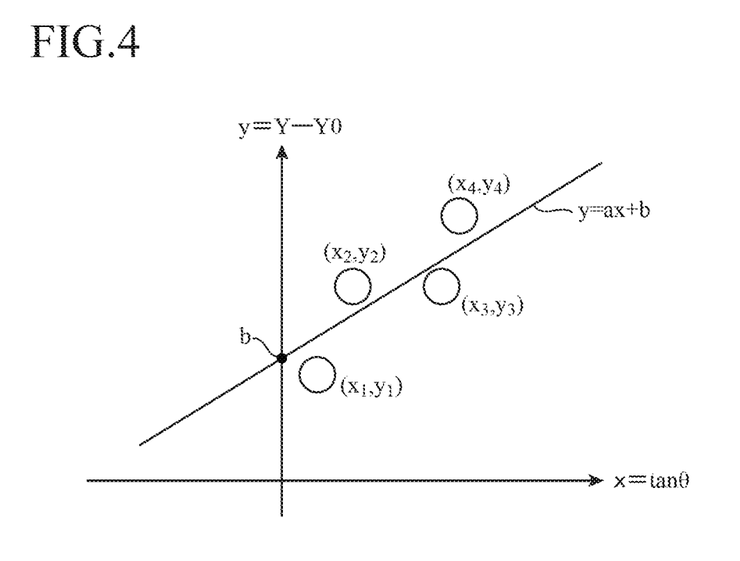

FIG. 4 is a view illustrating the relationship between the train-position correction amount b and the track distance a. With Expressions (1) and (2) described above, tan θ calculated from the radio wave's angle of arrival θ when the train 40 is present in the vicinity of the ground-based wireless communication apparatus 30 is represented by an x axis, and the distance from the ground-based wireless communication apparatus position Y0 to the train position Y is represented by a y axis. As a result, as shown in FIG. 4, the relationship between tan θ calculated from the radio wave's angle of arrival θ and the distance from the ground-based wireless communication apparatus position Y0 to the train position Y is a linear relationship represented by the train-position correction amount b and the track distance a in Expression (2).

Herein, a description will be given of a method for calculating the train-position correction amount b and the track distance a.

While the train 40 runs on the track road 41 in the vicinity of the ground-based wireless communication apparatus 30, the position acquisition unit 13 for a ground-based wireless communication apparatus acquires the ground-based wireless communication apparatus position Y0. In addition, the radio-wave's AOA calculator 14 and the train-position calculator 15 acquire the radio wave's angles of arrival θ and the train positions Y at n points where n is equal to or larger than 2.

The correction-amount calculator 16 calculates measurement values $(x_1, y_1), (x_2, y_2), \ldots, (x_n, y_n)$ at n points by using the ground-based wireless communication apparatus position Y0 acquired by the position acquisition unit 13 for a ground-based wireless communication apparatus and the radio wave's angles of arrival θ and the train positions Y of n points.

Subsequently, the track-distance calculator 16a and the correction-amount-to-train-position calculator 16b calculate the track distance a and the train-position correction amount b by a linear approximation based on a least squares method to the measurement values of n points. The y intercept of the approximate straight line by the least squares method corresponds to the train-position correction amount b, and the slope thereof corresponds to the track distance a. The values a and b are calculated from the following Expressions (3) and (4).

$$a = \frac{n\sum_{i=1}^{n} x_i y_i - \sum_{i=1}^{n} x_i \sum_{i=1}^{n} y_i}{n\sum_{i=1}^{n} x_i^2 - \left(\sum_{i=1}^{n} x_i\right)^2} \quad (3)$$

$$b = \frac{\sum_{i=1}^{n} x_i \sum_{i=1}^{n} y_i - \sum_{i=1}^{n} x_i y_i \sum_{i=1}^{n} x_i}{n\sum_{i=1}^{n} x_i^2 - \left(\sum_{i=1}^{n} x_i\right)^2} \quad (4)$$

The train-position correcting unit 17 calculates a corrected train position in which the measurement error is corrected by using the train position output by the train-position calculator 15 and the train-position correction amount output by the correction-amount-to-train-position calculator 16b. The train-position correcting unit 17 outputs the corrected train position as the final train position. Note that, in the case where the tachometer-generator is used, it is preferable to perform the calculation when the train does not accelerate and the wheel does not slip or skid.

A corrected train position Y' is calculated from the following Expression (5) by using the train position Y and the train-position correction amount b.

$$Y'=Y-b \quad (5)$$

Figure 5:
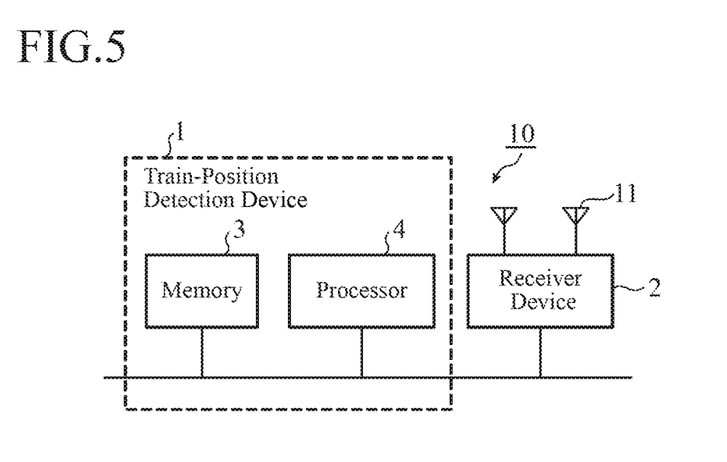
FIG. 5 is a hardware configuration diagram of the train-position detection device according to Embodiment 1.

Next, a description will be given of the hardware configuration of the in-vehicle wireless communication apparatus 10 including the train-position detection device 1. FIG. 5 is a hardware configuration diagram of the in-vehicle wireless communication apparatus 10. The receiver 12 of the in-vehicle wireless communication apparatus 10 is a receiver device 2. The position acquisition unit 13 for a ground-based wireless communication apparatus, the radio-wave's AOA calculator 14, the train-position calculator 15, the correction-amount calculator 16, and the train-position correcting unit 17 are implemented by a processor 4 that executes a program stored in a memory 3. The processor 4 is a processing circuit such as a CPU or a system LSI. A plurality of processors and a plurality of memories may cooperate with each other to execute the above functions.

Figure 6:
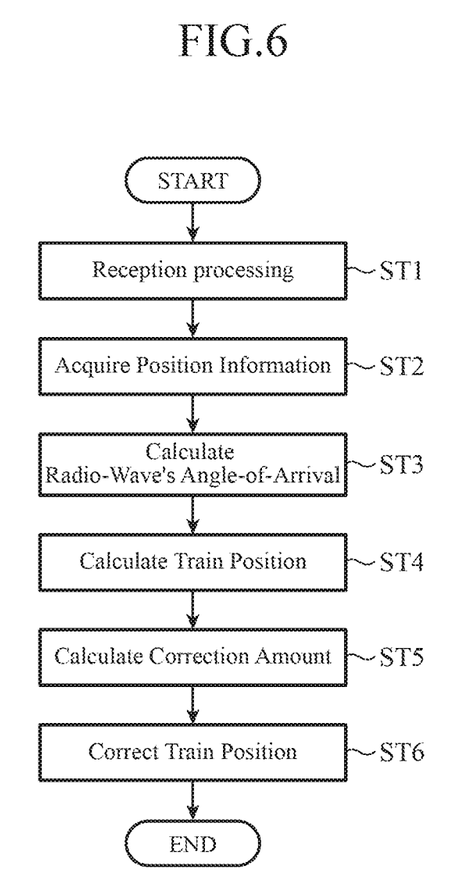
FIG. 6 is a flowchart showing an example of the operation of the train-position detection device according to Embodiment 1.

Next, a description will be given of the operation of the in-vehicle wireless communication apparatus 10 including the train-position detection device 1. FIG. 6 is a flowchart showing an example of the operation of the train-position detection device 1.

First, in Step ST1, the receiver 12 extracts and amplifies the radio wave component emitted from the ground-based wireless communication apparatus 30, and outputs the radio wave component to each of the position acquisition unit 13 for a ground-based wireless communication apparatus and the radio-wave's AOA calculator 14 as the reception signal.

In Step ST2, the position acquisition unit 13 for a ground-based wireless communication apparatus acquires the position information indicative of the installation position of the ground-based wireless communication apparatus 30 from the reception signal output by the receiver 12, and outputs the position information to the correction-amount calculator 16 as the ground-based wireless communication apparatus position.

In Step ST3, the radio-wave's AOA calculator 14 calculates the angle of arrival of the radio wave from the ground-based wireless communication apparatus 30 on the basis of the reception signal output by the receiver 12, and outputs the radio wave's angle of arrival to the correction-amount calculator 16. Note that, in Step ST3, the radio-wave's AOA calculator 14 acquires the radio wave's angles of arrival at n points where n is equal to or larger than 2.

In Step ST4, the train-position calculator 15 calculates the train position based on the movement distance of the train 40, and outputs the train position to each of the correction-amount calculator 16 and the train-position correcting unit 17. Note that, in Step ST4, the train-position calculator 15 acquires the train positions at n points where n is equal to or larger than 2.

In Step ST5, the correction-amount calculator 16 calculates the train-position correction amount for correcting the train position output by the train-position calculator 15 by using the ground-based wireless communication apparatus position output by the position acquisition unit 13 for a ground-based wireless communication apparatus, the radio wave's angle of arrival output by the radio-wave's AOA calculator 14, and the train position output by the train-position calculator 15, and outputs the train-position correction amount to the train-position correcting unit 17.

In Step ST6, the train-position correcting unit 17 calculates the corrected train position in which the measurement error is corrected by using the train position output by the train-position calculator 15 and the train-position correction amount output by the correction-amount calculator 16.

The in-vehicle wireless communication apparatus 10 operates in the following manner.

Note that the order of the operations in Steps ST2, ST3, and ST4 does not needed to be this order, the operation order may be changed, and the operations may be performed at the same time.

Thus, according to Embodiment 1, since the train-position detection device 1 is configured to include the radio-wave's AOA calculator 14 for calculating the radio wave's angle of arrival based on the reception signal received from the ground-based wireless communication apparatus 30, the position acquisition unit 13 for a ground-based wireless communication apparatus for acquiring the information on the installation position of the ground-based wireless communication apparatus 30 from the reception signal, the train-position calculator 15 for calculating the train position based on the movement distance of the train 40, the correction-amount-to-train-position calculator 16b for calculating the train-position correction amount by using the radio wave's angle of arrival calculated by the radio-wave's AOA calculator 14, the installation position of the ground-based wireless communication apparatus 30 acquired by the position acquisition unit 13 for a ground-based wireless communication apparatus, and the train position calculated by the train-position calculator 15, and the train-position correcting unit 17 for correcting the train position calculated by the train-position calculator 15 by using the train-position correction amount calculated by the correction-amount-to-train-position calculator 16b, it is possible to detect the train position with high accuracy without using information on the positions of the ground-based devices and their track distances that have been required conventionally. As a result, the effect is achieved that it is possible to reduce a cost required for installation and maintenance of the ground-based devices. In addition, setting of the track distance becomes unnecessary, and hence the effect is achieved that it is possible to prevent the occurrence of an error caused by erroneous setting of the track distance when the train position is calculated.

Embodiment 2

In Embodiment 1 as described above, the method for detecting the position of the train with high accuracy has been described. In Embodiment 2, a description will be given of running-track-number detection for detecting not only the position of the train but also the track (line) on which the train runs when the track of a railroad is constituted by a plurality of lines.

Figure 7:
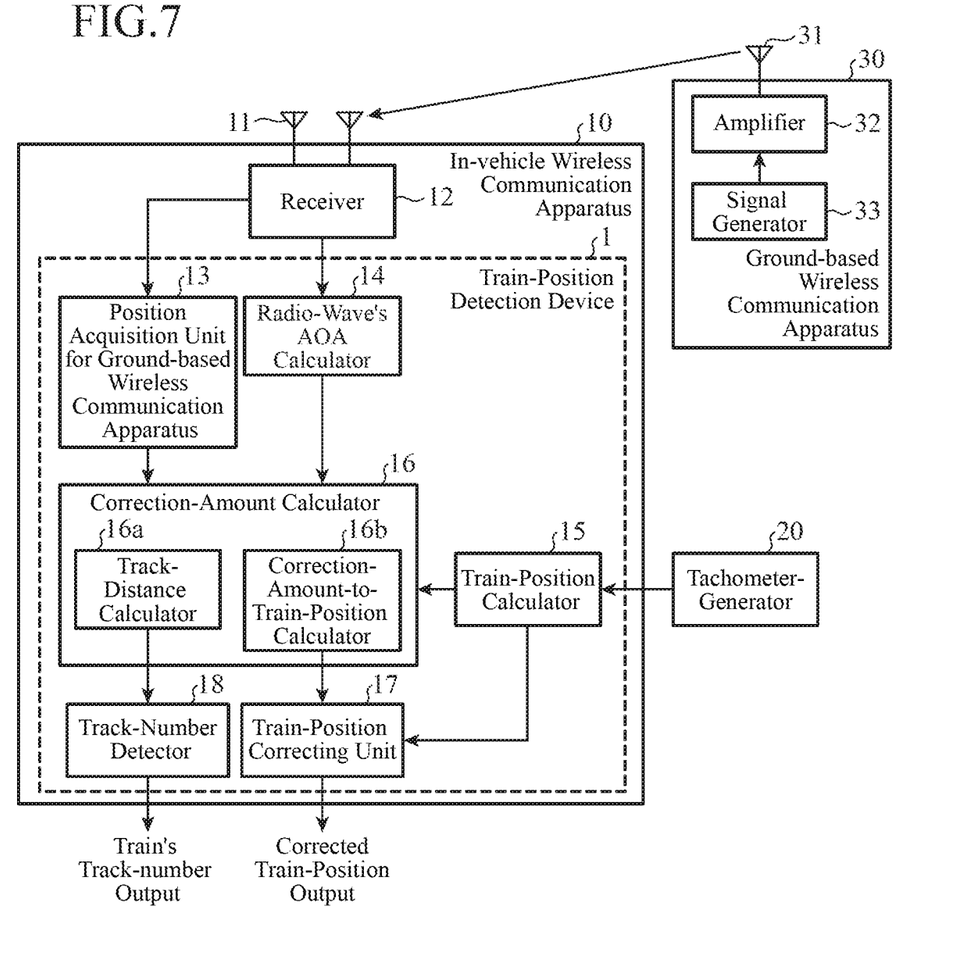
FIG. 7 is a block diagram showing an example of the configuration of the train position detection system that uses the train-position detection device according to Embodiment 2 of the invention.

FIG. 7 is a block diagram showing an example of the configuration of the train position detection system that uses the train-position detection device 1 according to Embodiment 2. In FIG. 7, portions identical or corresponding to those in FIGS. 1 and 2 are designated by the same reference numerals, and the description thereof will be omitted. In Embodiment 2, the train-position detection device 1 includes a track-number detector 18.

As described with respect to Embodiment 1 described above, the track-distance calculator 16a of the correction-amount calculator 16 calculates the track distance between the track road 41 on which the train 40 runs and the ground-based wireless communication apparatus 30. In Embodiment 2, the track distance calculated by the track-distance calculator 16a is output to the track-number detector 18.

The track-number detector 18 calculates the distance between the ground-based wireless communication apparatus 30 and each track by using map information indicative of the installation position of the ground-based wireless communication apparatus 30 and the position of each track of the track road 41 constituted by the plurality of tracks. Subsequently, the track-number detector 18 detects the assigned number of the track on which the train 40 runs by checking the track distance output by the track-distance calculator 16a with the distance calculated by using the map information, and outputs the running track.

The track-number detector 18 is implemented by execution of a program stored in the memory 3 by the processor 4 shown in FIG. 5. The map information is stored in the memory 3.

Figure 8:
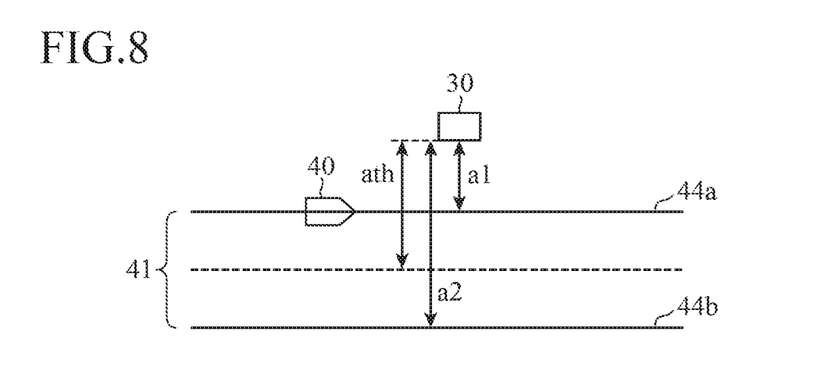
FIG. 8 is a view illustrating a track-number detection method based on the track distance.

Herein, by using FIG. 8, a description will be given of a track-number detection method based on the track distance. In the case where a first track 44a and a second track 44b are present in the track road 41, the track distance from the ground-based wireless communication apparatus 30 to the first track 44a is indicated by a1, and the track distance from the ground-based wireless communication apparatus 30 to the second track 44b is indicated by a2. The track-number detector 18 sets a track-number determination threshold ath for determination of the first track 44a and the second track 44b, based on the track distances a1 and a2 included in the map information.

As described above with respect to Embodiment 1, the track-distance calculator 16a calculates the track distance a, and the track-number detector 18 performs threshold determination of the track distance a using the track-number determination threshold ath to detect which one of the first track 44a and the second track 44b the train 40 runs on. In an example in FIG. 8, a≈a1<ath is satisfied, and hence the first track 44a is the running track.

With the foregoing, according to Embodiment 2, the train-position detection device 1 is configured to include the track-distance calculator 16a for calculating the track distance between the ground-based wireless communication apparatus 30 and the track road 41 on which the train 40 runs by using the radio wave's angle of arrival calculated by the radio-wave's AOA calculator 14, the installation position of the ground-based wireless communication apparatus 30 acquired by the position acquisition unit 13 for a ground-based wireless communication apparatus, and the train position calculated by the train-position calculator 15, and the track-number detector 18 for detecting the track of the track road 41 on which the train 40 runs by using the track distance calculated by the track-distance calculator 16a. Conventionally, it is necessary to set the track distance and it has not been possible to detect the running line but, in Embodiment 2, since it is possible to detect the running line, it becomes possible to cope with a double-tracked line.

Embodiment 3

In Embodiment 3, descriptions will be given of a configuration in which an angle of arrival of a radio wave is calculated with high accuracy in the case where the monopulse angle measurement method, which has been described with respect to Embodiment 1 as a method for calculating the radio wave's angle of arrival in the radio-wave's AOA calculator 14, is adopted.

Figure 9:
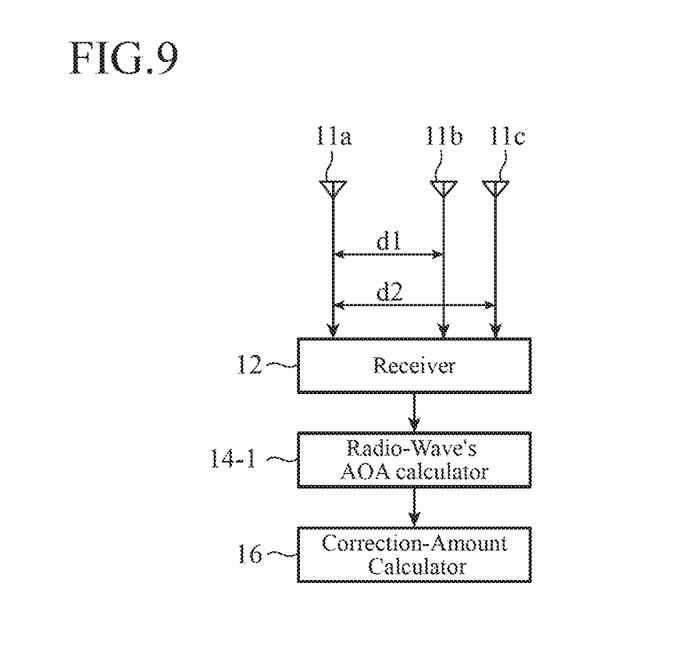
FIG. 9 is a block diagram showing an example of the configuration of the principal portion of the train position detection system that uses the train-position detection device according to Embodiment 3 of the invention.

FIG. 9 is a block diagram showing an example of the configuration of the principal portion of the train position detection system that uses the train-position detection device 1 according to Embodiment 3 of the invention. In FIG. 9, the configuration of the in-vehicle wireless communication apparatus 10 other than antennas 11a, 11b, and 11c, the receiver 12, a radio-wave's AOA calculator 14-1, and the correction-amount calculator 16 is the same as that in FIG. 2, and hence the depiction thereof will be omitted.

The in-vehicle wireless communication apparatus 10 of Embodiment 3 includes three antennas of the antenna 11a (first antenna), the antenna 11b (second antenna), and the antenna 11c (third antenna) as the array antenna 11. The three antennas 11a, 11b, and 11c constitute a linear array antenna in which the three antennas are aligned on a straight line parallel to the running direction of the train 40. A distance d1 between the antenna 11a and the antenna 11b and a distance d2 between the antenna 11a and the antenna 11c have a relationship that satisfies d1<d2. Specifically, when the wavelength of the reception signal is represented by λ, d1 and d2 have a relationship that satisfies d1=λ/2 and d2=2λ/3.

The radio-wave's AOA calculator 14-1 calculates an angle of arrival θ1 of a radio wave on the basis of the reception signals received by the antenna 11a and the antenna 11b and the distance d1 between the antenna 11a and the antenna 11b by using Expression (7) derived from Expression (6) shown below.

$$\phi 1 = k \times d1 \times \sin \theta 1 \quad (6)$$

$$\theta 1 = \sin^{-1}(\phi 1/(k \times d1)) \quad (7)$$

Herein, φ1 is a phase angle difference between the reception signals received by the antenna 11a and the antenna 11b, k is a wave number, and θ1 is a first angle of arrival of a radio wave.

In addition, the radio-wave's AOA calculator 14-1 calculates an angle of arrival θ2 of a radio wave on the basis of the reception signals received by the antenna 11a and the antenna 11c and the distance d2 between the antenna 11a and the antenna 11c by using Expression (9) derived from Expression (8) shown below.

$$\phi 2 = k \times d2 \times \sin \theta 2 \quad (8)$$

$$\theta 2 = \sin^{-1}(\phi 2/(k \times d2)) \quad (9)$$

Herein, φ2 is a phase angle difference between the reception signals received by the antenna 11a and the antenna 11c, k is the wave number, and θ2 is a second angle of arrival of a radio wave.

Although the radio wave's angle of arrival θ1 is equal to the radio wave's angle of arrival θ2, the phase angle difference φ2 measured by Expression (8) is d2/d1 times larger than the phase angle difference φ1 measured by Expression (6). In addition, the phase angle difference can be measured only in a range between ±180 degrees, and phase angle differences outside the range has uncertainty of ±180 degrees.

The range of an angle of arrival of a radio wave to be measured, i.e., a dynamic range, is wider in the case of the distance d1 than in the case of the distance d2. Conversely, the resolution of the radio wave's angle of arrival to be measured is higher in the case of the distance d2 than in the case of the distance d1. Thus, the dynamic range and the resolution are in a trade-off relationship.

Next, descriptions will be given of the radio wave's angles of arrival which are output by the radio-wave's AOA calculator 14-1.

In the case where the radio wave's angle of arrival θ1 calculated by using the antenna 11a and the antenna 11b is outside the range of a predetermined angle (e.g., between ±45 degrees) with which the calculation of the train-position correction amount is performed by the correction-amount calculator 16, the radio-wave's AOA calculator 14-1 outputs the radio wave's angle of arrival θ1 to the correction-amount calculator 16.

In addition, in the case where the radio wave's angle of arrival θ2 calculated by using the antenna 11a and the antenna 11c is within the range of the predetermined angle (e.g., −45 to +45 degrees) with which the calculation of the train-position correction amount is performed by the correction-amount calculator 16, the radio-wave's AOA calculator 14-1 outputs the radio wave's angle of arrival θ2 to the correction-amount calculator 16.

The distance d1 between the antenna 11a and the antenna 11b is assumed to be set to a distance with which the dynamic range for the radio wave's angle of arrival beyond the range between ±90 degrees. On the other hand, the distance d2 between the antenna 11a and the antenna 11c is assumed to be set to a distance with which the dynamic range for the radio wave's angle of arrival is within the range between ±90 degrees and to be equal to or larger than the above predetermined angle (e.g., between ±45 degrees). With this, the accuracy of the radio wave's angle of arrival used in the calculation by the correction-amount calculator 16 is improved, and the accuracy of each of the train-position correction amount and the track distance calculated by the correction-amount-to-train-position calculator 16b and the track-distance calculator 16a is also improved.

As described with respect to Embodiment 1, the above-described predetermined angle (e.g., between ±45 degrees) corresponds to when the train 40 is present on the track road 41 in the vicinity of the ground-based wireless communication apparatus 30, and when the track-distance calculator 16a and the correction-amount-to-train-position calculator 16b perform the calculations of the track distance and the train position correction amount.

The radio-wave's AOA calculator 14-1 shown in FIG. 9 receives the signals received by the antennas 11a, 11b, and 11c at the same time and calculates the radio wave's angles of arrival θ1 and θ2, but the phase angle difference between the antennas 11a and 11b and the phase angle difference between the antennas 11a and 11c may also be calculated at different timings by switching between the antenna 11b and the antenna 11c using a switch.

Figure 10:
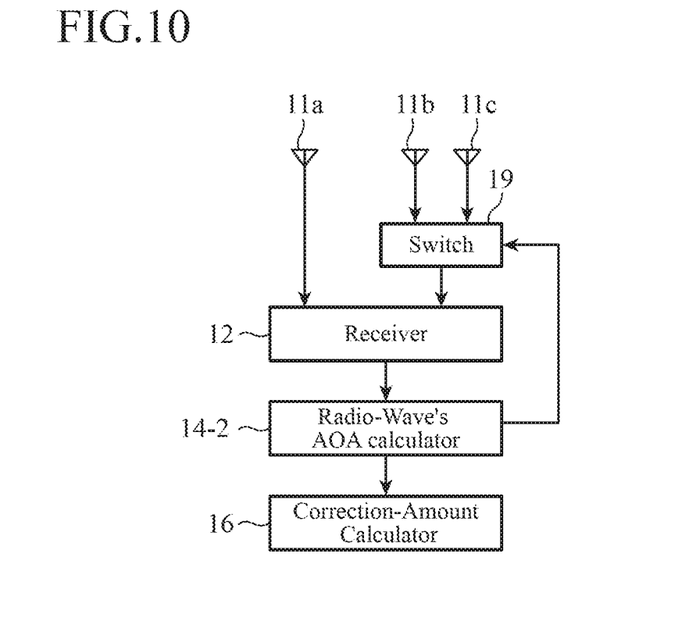
FIG. 10 is a block diagram showing an example of a modification of the principal portion in the train position detection system in FIG. 9.

In the following, a description will be given of a modification in which the in-vehicle wireless communication apparatus 10 includes a switch 19 that switches between the antenna 11b and the antenna 11c. FIG. 10 is a block diagram showing the modification of the principal portion of the train position detection system that uses the train-position detection device 1 according to Embodiment 3. In FIG. 10, the configuration of the in-vehicle wireless communication apparatus 10 other than the switch 19, the antennas 11a, 11b, and 11c, the receiver 12, a radio-wave's AOA calculator 14-2, and the correction-amount calculator 16 is the same as that in FIG. 2, and hence the depiction thereof will be omitted.

In FIG. 10, the radio-wave's AOA calculator 14-2 outputs a switch control signal to the switch 19. In the in-vehicle wireless communication apparatus 10 in FIG. 10, two control states of control for connecting the antenna 11b and the receiver 12 and control for connecting the receiver 12 and the antenna 11c are present, and the control state is switched between the two control states with the switch control signal.

The switch 19 switches the connection state between the antenna 11b or 11c and the receiver 12 according to the switch control signal output by the radio-wave's AOA calculator 14-2.

When the antenna 11b and the receiver 12 are connected, the radio-wave's AOA calculator 14-2 calculates an angle of arrival θ1 of a radio wave on the basis of the reception signals received by the antenna 11a and the antenna 11b and the distance d1 between the antenna 11a and the antenna 11b by using Expression (7) derived from Expression (6) shown above.

In addition, when the antenna 11c and the receiver 12 are connected, the radio-wave's AOA calculator 14-2 calculates an angle of arrival θ2 of a radio wave on the basis of the reception signals received by the antenna 11a and the antenna 11c and the distance d2 between the antenna 11a and the antenna 11c by using Expression (9) derived from Expression (8) shown above.

Next, a description will be given of a method for switching the connection of the switch 19 by the radio-wave's AOA calculator 14-2.

First, the radio-wave's AOA calculator 14-2 outputs the switch control signal to the switch 19 such that the antenna 11b and the receiver 12 are connected. Subsequently, the radio-wave's AOA calculator 14-2 calculates an angle of arrival θ1 of a radio wave by using the antenna 11a and the antenna 11b. In the case where the calculated angle of arrival θ1 of the radio wave is outside the range of the predetermined angle (e.g., between ±45 degrees) with which the calculation of the train-position correction amount is performed by the correction-amount calculator 16, the radio-wave's AOA calculator 14-2 outputs the radio wave's angle of arrival θ1 to the correction-amount calculator 16. On the other hand, in the case where the calculated angle of arrival θ1 of the radio wave is within the range of the predetermined angle (e.g., between ±45 degrees) with which the calculation of the train-position correction amount is performed by the correction-amount calculator 16, the radio-wave's AOA calculator 14-2 outputs the switch control signal to the switch 19 such that the antenna 11c and the receiver 12 are connected instead of outputting the radio wave's angle of arrival θ1 to the correction-amount calculator 16.

After the radio-wave's AOA calculator 14-2 outputs the switch control signal to the switch 19 such that the antenna 11c and the receiver 12 are connected, the radio-wave's AOA calculator 14-2 calculates an angle of arrival θ2 of a radio wave by using the antenna 11a and the antenna 11c. In the case where the calculated angle of arrival θ2 of the radio wave is within the range of the predetermined angle (e.g., between ±45 degrees) with which the calculation of the train-position correction amount is performed by the correction-amount calculator 16, the radio-wave's AOA calculator 14-2 outputs the radio wave's angle of arrival θ2 to the correction-amount calculator 16. On the other hand, in the case where the calculated angle of arrival θ2 of the radio wave is outside the range of the predetermined angle (e.g., between ±45 degrees) with which the calculation of the train-position correction amount is performed by the correction-amount calculator 16, the radio-wave's AOA calculator 14-2 outputs the switch control signal to the switch 19 such that the antenna 11b and the receiver 12 are connected instead of outputting the radio wave's angle of arrival θ2 to the correction-amount calculator 16.

With the foregoing, according to Embodiment 3, the in-vehicle wireless communication apparatus 10 includes the antennas 11a, 11b, and 11c arranged on the straight line along the running direction of the train 40. In the case where an angle of arrival of the radio wave that arrives from the direction orthogonal to the track road on which the train 40 runs is 0 degrees, the distance d1 between the antenna 11a and the antenna 11b is set in a manner that the dynamic range for the radio wave's angle of arrival in the monopulse angle measurement is within the range between ±90 degrees, and the distance d2 between the antenna 11a and the antenna 11c is set in a manner that the dynamic range is the predetermined angle range with which the calculation of the train-position correction amount is performed by the correction-amount calculator 16. Each of the radio-wave's AOA calculators 14-1 and 14-2 is configured to calculate an angle of arrival θ1 of a radio wave by using the antenna 11a and the antenna 11b and calculate an angle of arrival θ2 of a radio wave by using the antenna 11a and the antenna 11c by the monopulse angle measurement, and configured to output the radio wave's angle of arrival θ2 in the case where the radio wave's angle of arrival θ1 is within the predetermined angle and output the radio wave's angle of arrival θ1 in the other cases. With this, each of the radio-wave's AOA calculators 14-1 and 14-2 is capable of calculating the radio wave's angle of arrival with high accuracy.

Note that, in the invention, it is possible to freely combine the embodiments, modify any components in the embodiments, or omit any components in the embodiments within the scope of the invention.

INDUSTRIAL APPLICABILITY

The train-position detection device according to the invention is configured to detect the position of the train without using the information on the position of the ground-based device and its track distance, and hence the train-position detection device is suitably used especially as a train-position detection device capable of detecting the position of the train that runs on the track road that is not provided with the ground-based device.

REFERENCE SIGNS LIST

1: train-position detection device; 2: receiver device; 3: memory; 4: processor; 10: in-vehicle wireless communication apparatus; 11: array antenna; 11a, 11b, 11c: antenna; 12: receiver; 13: position acquisition unit 13 for a ground-based wireless communication apparatus; 14, 14-1, 14-2: radio-wave's AOA calculator; 15: train-position calculator; 16: correction-amount calculator; 16a: track-distance calculator; 16b: correction-amount-to-train-position calculator; 17: train-position correcting unit; 18: track-number detector; 19: switch; 20: tachometer-generator; 30: ground-based wireless communication apparatus; 31: antenna; 32: amplifier; 33: signal generator; 40, 40a, 40b: train; 41, 41a, 41b: track road; 42: utility pole; 43a, 43b: tangent; 44a: first line; and 44b: second line.

The invention claimed is:

1. A train-position detection device that detects a position of a train by using a reception signal which, when a ground-based wireless communication apparatus installed on a ground emits a transmission signal as a radio wave including information on an installation position, is extracted by an in-vehicle wireless communication apparatus mounted on the train from the radio wave that has been received by the in-vehicle wireless communication apparatus, the train-position detection device comprising:
- a radio-wave's angle-of-arrival calculator configured to calculate an angle of arrival of a radio wave on a basis of the reception signal;
- a position acquisition unit, for the ground-based wireless communication apparatus, configured to acquire information regarding the installation position of the ground-based wireless communication apparatus, from the reception signal;
- a train-position calculator configured to calculate a train position based on a movement distance of the train;
- a correction-amount-to-train-position calculator configured to calculate a train-position correction amount for correcting the train position calculated by the train-position calculator, by using the acquired information regarding the installation position, and a plurality of combinations of the angle of arrival of the radio wave and the train position related to a same ground-based wireless communication apparatus, the plurality of combinations calculated at a plurality of times corresponding to when the train runs through a plurality of points on a track road; and
- a train-position correcting unit configured to correct the train position calculated by the train-position calculator, by using the train-position correction amount calculated by the correction-amount-to-train-position calculator.

2. The train-position detection device according to claim 1, further comprising:
- a track-distance calculator to calculate a track distance between the ground-based wireless communication apparatus and a track road on which the train runs by using
  - the angle of arrival of the radio wave calculated by the radio-wave's angle-of-arrival calculator,
  - the installation position of the ground-based wireless communication apparatus acquired by the position acquisition unit for the ground-based wireless communication apparatus, and
  - the train position calculated by the train-position calculator; and
- a track-number detector configured to detect an assigned number of the track road on which the train runs, by using the track distance calculated by the track-distance calculator.

3. The train-position detection device according to claim 2, wherein the track-distance calculator calculates the track distance, by using the acquired information on the installation position, and a plurality of combinations of the angle of arrival of the radio wave and the train position related to the same ground-based wireless communication apparatus, calculated when the train runs through a plurality of points on the track road.

4. The train-position detection device according to claim 3, wherein the track-distance calculator calculates an approximate straight line that represents a relationship between the angle of arrival of the radio wave and a distance from the train position to the installation position of the ground-based wireless communication apparatus, and sets a value of a slope of the approximate straight line as the track distance.

5. The train-position detection device according to claim 1, wherein the correction-amount-to-train-position calculator calculates an approximate straight line that represents a relationship between the angle of arrival of the radio wave and a distance from the train position to the installation position of the ground-based wireless communication apparatus, and sets a value of an intercept of the approximate straight line as the train-position correction amount.

6. The train-position detection device according to claim 1, wherein:
- the in-vehicle wireless communication apparatus includes a first antenna, a second antenna, and a third antenna arranged on a straight line along a running direction of the train;
- in a case where the angle of arrival of the radio wave that arrives from a direction orthogonal to a train's track road is 0 degrees, a distance between the first antenna and the second antenna is set in a manner that a dynamic range for the angle of arrival of the radio wave in monopulse angle measurement is a range between ±90 degrees, and a distance between the first antenna and the third antenna is set in a manner that the dynamic range is a predetermined angle range with which the calculation of the train-position correction amount is performed by the correction-amount-to-train-position calculator; and
- the radio-wave's angle-of-arrival calculator calculates a first angle of arrival of a radio wave by using the first antenna and the second antenna and calculates a second angle of arrival of the radio wave by using the first antenna and the third antenna, by the monopulse angle measurement, outputs the second angle of arrival when the first angle of arrival is within the predetermined angle range, and outputs the first angle of arrival when the first angle of arrival is beyond the predetermined angle range.

7. A train-position detection device that detects a position of a train by using a reception signal which, when a ground-based wireless communication apparatus installed on a ground emits a transmission signal as a radio wave including information on an installation position, is extracted by an in-vehicle wireless communication apparatus mounted on the train from the radio wave that has been received by the in-vehicle wireless communication apparatus, the train-position detection device comprising:
- angle-of-arrival calculation circuitry configured to calculate an angle of arrival of a radio wave on a basis of the reception signal;
- position acquisition circuitry, for the ground-based wireless communication apparatus, configured to acquire information on the installation position of the ground-based wireless communication apparatus, from the reception signal;
- train-position calculation circuitry configured to calculate a train position based on a movement distance of the train;
- correction-amount-to-train-position calculation circuitry configured to calculate a train-position correction amount for correcting the train position calculated by the train-position calculation circuitry, by using the acquired information regarding the installation position, and a plurality of combinations of the angle of arrival of the radio wave and the train position related to a same ground-based wireless communication apparatus, the plurality of combinations calculated at a plurality of times corresponding to when the train runs through a plurality of points on a track road; and
- train-position correcting circuitry configured to correct the train position calculated by the train-position calculation circuitry, by using the train-position correction amount calculated by the correction-amount-to-train-position calculation circuitry.

8. The train-position detection device according to claim 7, further comprising:
track-distance calculation circuitry to calculate a track distance between the ground-based wireless communication apparatus and the track road on which the train runs by using
the angle of arrival of the radio wave calculated by the radio-wave's angle-of-arrival calculator,
the installation position of the ground-based wireless communication apparatus acquired by the position acquisition circuitry for the ground-based wireless communication apparatus, and
the train position calculated by the train-position calculation circuitry; and
a track-number detection circuitry configured to detect an assigned number of the track road on which the train runs, by using the track distance calculated by the track-distance calculation circuitry.

9. The train-position detection device according to claim 8, wherein the track-distance calculation circuitry calculates the track distance, by using the acquired information on the installation position, and a plurality of combinations of the angle of arrival of the radio wave and the train position related to a same ground-based wireless communication apparatus, calculated when the train runs through a plurality of points on the track road.

10. The train-position detection device according to claim 9, wherein the track-distance calculation circuitry calculates an approximate straight line that represents a relationship between the angle of arrival of the radio wave and a distance from the train position to the installation position of the ground-based wireless communication apparatus, and sets a value of a slope of the approximate straight line as the track distance.

11. The train-position detection device according to claim 7, wherein the correction-amount-to-train-position calculation circuitry calculates an approximate straight line that represents a relationship between the angle of arrival of the radio wave and a distance from the train position to the installation position of the ground-based wireless communication apparatus, and sets a value of an intercept of the approximate straight line as the train-position correction amount.

12. The train-position detection device according to claim 7, wherein:
the in-vehicle wireless communication apparatus includes a first antenna, a second antenna, and a third antenna arranged on a straight line along a running direction of the train;
in a case where the angle of arrival of the radio wave that arrives from a direction orthogonal to the train's track road is 0 degrees, a distance between the first antenna and the second antenna is set in a manner that a dynamic range for the angle of arrival of the radio wave in monopulse angle measurement is a range between ±90 degrees, and a distance between the first antenna and the third antenna is set in a manner that the dynamic range is a predetermined angle range with which the calculation of the train-position correction amount is performed by the correction-amount-to-train-position calculation circuitry; and
the angle-of-arrival calculation circuitry is further configured to
calculate a first angle of arrival of a radio wave by using the first antenna and the second antenna,
calculate a second angle of arrival of the radio wave by using the first antenna and the third antenna, by the monopulse angle measurement,
output the second angle of arrival when the first angle of arrival is within the predetermined angle range, and
output the first angle of arrival when the first angle of arrival is beyond the predetermined angle range.

* * * * *